US007905610B1

(12) United States Patent
Shapiro (10) Patent No.: US 7,905,610 B1
(45) Date of Patent: Mar. 15, 2011

(54) GRAPHICS PROCESSOR SYSTEM AND ASSOCIATED METHOD FOR PROJECTING AN IMAGE ONTO A THREE-DIMENSIONAL OBJECT

(75) Inventor: Dmitry R. Shapiro, Acton, MA (US)

(73) Assignee: NVIDIA Corporation, Santa Clara, CA (US)

(*) Notice: Subject to any disclaimer, the term of this patent is extended or adjusted under 35 U.S.C. 154(b) by 598 days.

(21) Appl. No.: 11/468,236

(22) Filed: Aug. 29, 2006

(51) Int. Cl.
G03B 21/00 (2006.01)
G03B 21/26 (2006.01)
G06T 15/00 (2006.01)
G06T 15/50 (2006.01)
G06T 15/60 (2006.01)
G06T 17/00 (2006.01)

(52) U.S. Cl. .......... 353/121; 353/28; 353/122; 345/419; 345/420; 345/426

(58) Field of Classification Search .......... 353/28, 353/69–70, 94, 97, 121–122; 345/419–420, 345/619, 647, 426, 501, 632–633; 700/182; 703/1; 359/451
See application file for complete search history.

(56) References Cited

U.S. PATENT DOCUMENTS

| | | | | |
|---|---|---|---|---|
| 5,687,305 A * | 11/1997 | Graham et al. | ............... | 345/632 |
| 6,211,903 B1 * | 4/2001 | Bullister | .................. | 348/14.16 |
| 6,431,711 B1 * | 8/2002 | Pinhanez | ..................... | 353/69 |
| 6,597,363 B1 * | 7/2003 | Duluk et al. | ................. | 345/506 |
| 6,629,065 B1 * | 9/2003 | Gadh et al. | ..................... | 703/1 |
| 6,644,816 B1 * | 11/2003 | Perra et al. | ..................... | 353/119 |
| 6,819,365 B1 * | 11/2004 | Peng | ................................ | 349/9 |
| 7,019,748 B2 * | 3/2006 | Raskar | ........................ | 345/473 |
| 7,175,288 B2 * | 2/2007 | Wu | ................................. | 353/98 |
| 7,397,891 B2 * | 7/2008 | Johnson et al. | ............... | 378/57 |
| 7,463,261 B1 * | 12/2008 | O'Donnell | .................. | 345/427 |
| 7,488,079 B2 * | 2/2009 | Hennes | ........................ | 353/97 |
| 7,623,135 B1 * | 11/2009 | Diamond et al. | ............. | 345/582 |
| 2003/0011563 A1 * | 1/2003 | Wada | ............................ | 345/156 |
| 2003/0164927 A1 * | 9/2003 | Tsukada | ........................ | 353/31 |
| 2004/0189944 A1 * | 9/2004 | Kaufman et al. | .............. | 352/10 |
| 2005/0058332 A1 * | 3/2005 | Kaufman et al. | ............. | 382/133 |
| 2005/0088435 A1 * | 4/2005 | Geng | ............................ | 345/419 |
| 2007/0035545 A1 * | 2/2007 | Hempel et al. | ............... | 345/422 |
| 2007/0091088 A1 * | 4/2007 | Jiao et al. | ...................... | 345/426 |
| 2007/0257911 A1 * | 11/2007 | Bavoil et al. | .................. | 345/426 |
| 2010/0073366 A1 * | 3/2010 | Tateno | .......................... | 345/419 |

OTHER PUBLICATIONS

Weisstein, Eric W; "Surface"; MathWorld—A Wolfram Web Resource; http://mathworld.wolfram.com/Surface.html.*
Patrick Quirk, Tyler Johnson, Rick Skarbez, Herman Towles, Florian Gyarfas and Henry Fuchs; "RANSAC-Assisted Display Model Reconstruction for Projective Display"; IEEE VR2006 Workshop on Emerging Display Technologies (EDT2006) Workshop; Alexandria, Virginia; Mar. 2006; http://www.cs.unc.edu/Research/stc/publications.html.*

* cited by examiner

Primary Examiner — Georgia Y Epps
Assistant Examiner — Jori S Reilly-Diakun
(74) Attorney, Agent, or Firm — Zilka-Kotab, PC (57) ABSTRACT

A system and method are provided for projecting an image onto a three-dimensional object. In use, after an image is received, such image is processed utilizing a graphics processor for projecting the image onto the three-dimensional object in various embodiments, the image may be processed as a function of three-dimensional information associated with the three-dimensional object, for improving projection.

23 Claims, 5 Drawing Sheets

GRAPHICS PROCESSOR SYSTEM AND ASSOCIATED METHOD FOR PROJECTING AN IMAGE ONTO A THREE-DIMENSIONAL OBJECT

FIELD OF THE INVENTION

The present invention relates to projectors, and more particularly to projecting images onto three-dimensional objects.

BACKGROUND

Digital projectors, also known as digital projection display systems, are a specialized form of computer display that projects an enlarged image on a target object (e.g. movie screen, etc.). Such devices are commonly used in presentations. While there are numerous types of digital projection display systems, two main types are in use today.

Older, less expensive digital projection display systems typically employ three transparent (LCD) panels, one for each of the primary colors (e.g. red, green, and blue). The light transmittivity of each pixel varies depending on the image data received from a computer. In use, light from a lamp is directed through the LCD panels, collimated using a lens, and projected onto a screen.

A newer, more expensive technology is known as digital light processing (DLP) and involves tiny mirrors that are used instead of transparent panels. Typically each mirror represents one pixel, and the light, rather than passing through a panel, is reflected from the mirror. In operation, the mirrors move back and forth, varying the amount of light that reaches the projection lens from each pixel. Color may obtained by passing the light from the lamp through a rotating wheel with red, green, and blue filters. This subjects the mirrors to light at each of the primary colors in a rapid rotating sequence. To this end, a color-modulated image is projected that the human eye sees as natural color.

To date, these and other types of projectors have typically been used for projecting images onto two-dimensional objects such as a screen, etc. While there has been some research involving the projection of images onto three-dimensional objects, such work has been limited.

SUMMARY

A system and method are provided for projecting an image onto a three-dimensional object. In use, after an image is received, such image is processed utilizing a graphics processor for projecting the image onto the three-dimensional object. In various embodiments, the image may be processed as a function of three-dimensional information associated with the three-dimensional object, for improving projection.

DETAILED DESCRIPTION

Figure 1:
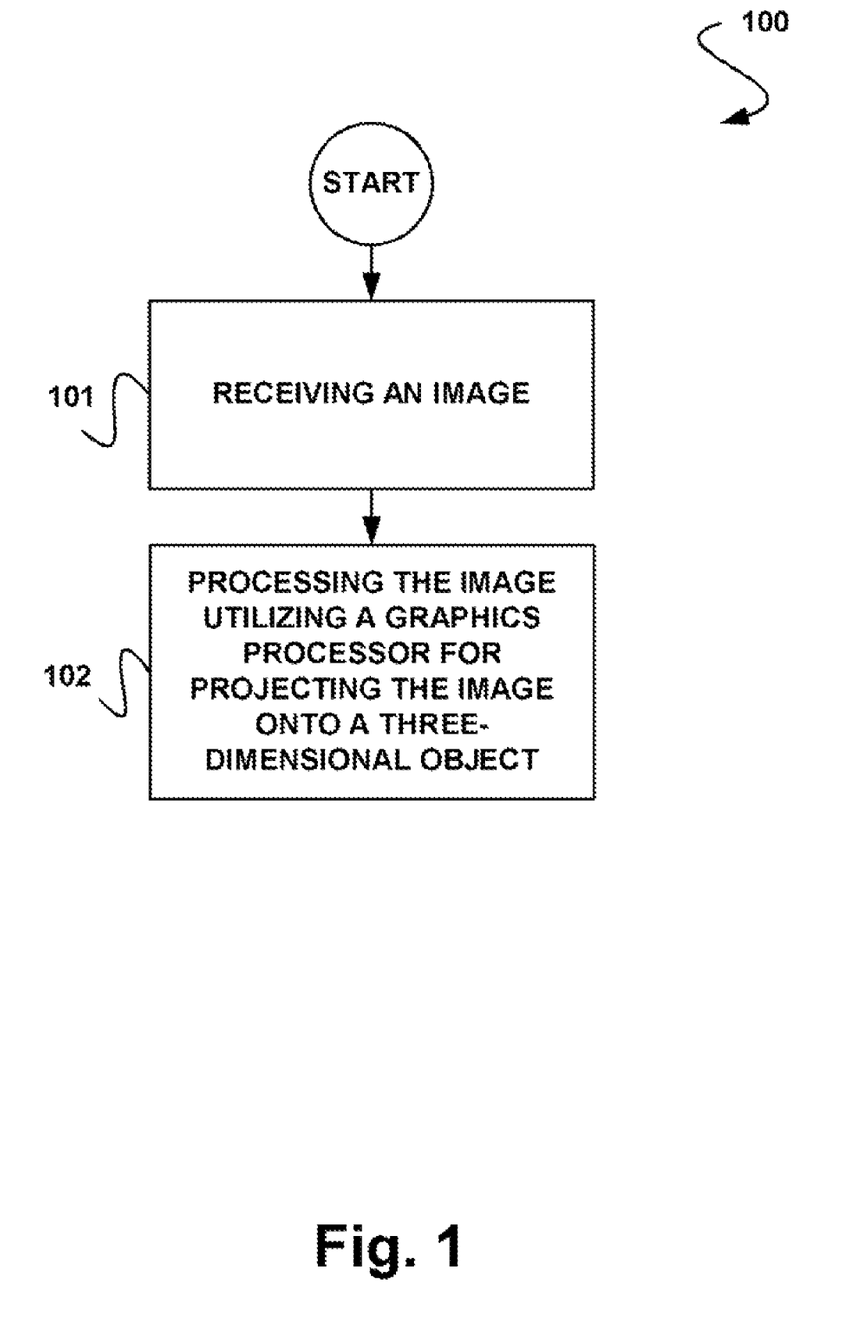
FIG. 1 shows a method for projecting an image onto a three-dimensional object, in accordance with one embodiment.

FIG. 1 shows a method 100 for projecting an image onto a three-dimensional object, in accordance with one embodiment. As shown in operation 101, an image is received. Such image may include any color data, texture data, lighting data, and/or any other data that is capable of being processed for the purpose of being projected. Still yet, the image may be received from any image source including a source that may be the same as or different from a system that performs the present method 100. Of course, in various embodiments, it is contemplated that a plurality of the images may optionally be projected onto the three-dimensional object in the form of a video.

Next, in operation 102, such image is processed utilizing a graphics processor for projecting the image onto the three-dimensional object. In the context of the present description, such graphics processor may include any hardware that is capable of performing graphics processing on the image. Still yet, the three-dimensional object may include any physical object with a three-dimensional surface onto which the image may be projected.

Thus, by utilizing the graphics processor for processing the image in the aforementioned way, the manner in which the image is projected onto the three-dimensional object may be improved. More illustrative information will now be set forth regarding various optional architectures and features with which the foregoing framework may or may not be implemented, per the desires of the user. For example, in various embodiments, the image may be processed as a function of three-dimensional information associated with the three-dimensional object, for further improving projection.

It should be strongly noted that the following information is set forth for illustrative purposes and should not be construed as limiting in any manner. Any of the following features may be optionally incorporated with or without the exclusion of other features described. For example, an embodiment is contemplated wherein various processing of an image is performed for projection purposes, but without necessarily a graphics processor.

Figure 2:
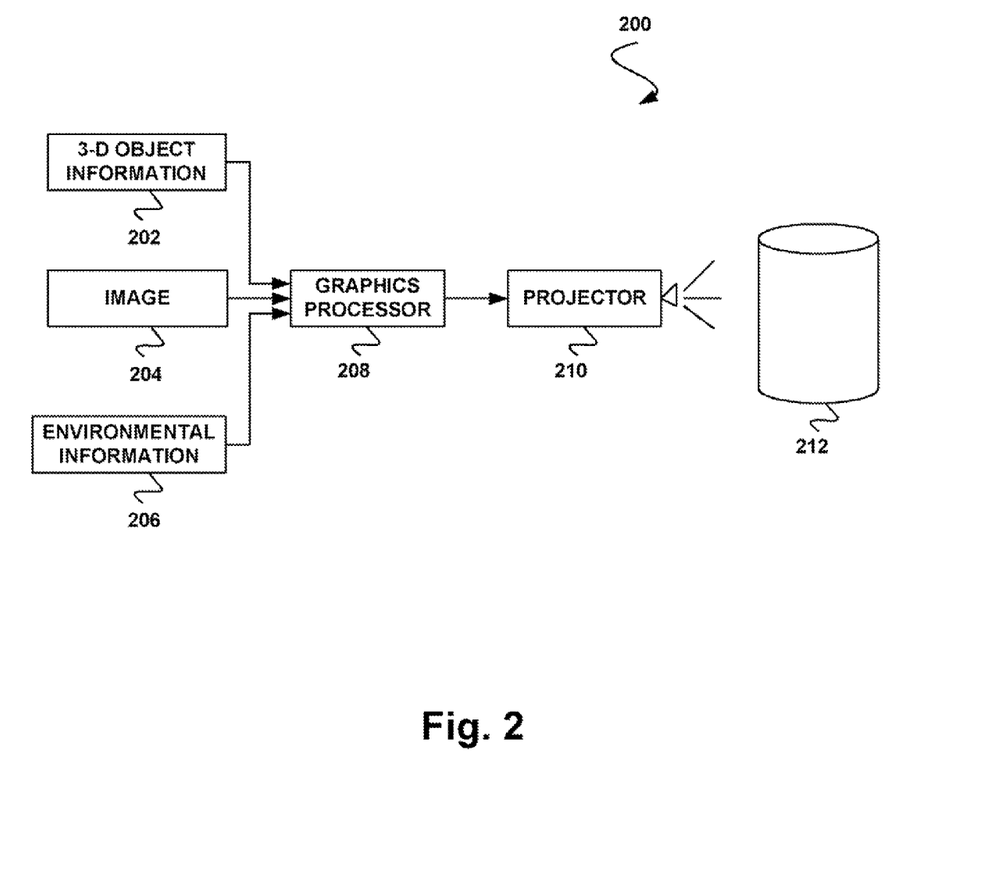
FIG. 2 shows a system for projecting an image onto a three-dimensional object, in accordance with another embodiment.

FIG. 2 shows a system 200 for projecting an image onto a three-dimensional object, in accordance with another embodiment. As an option, the present system 200 may be the subject of the method 100 of FIG. 1. Of course, however, the system 200 may be used in any desired environment. Still yet, the above definitions may apply during the following description.

As shown, a graphics processor 208 is provided for communicating with a projector 210. Such projector 210 may include a digital light processing projector, a liquid crystal display projector, etc. While the graphics processor 208 and the projector 210 are shown to be discrete components in FIG. 2, it should be noted that another embodiment is contemplated where such components (as well as others) may be integrated into a single device. More information regarding a more specific exemplary system including a graphics processor 208 and a projector 210 will be set forth hereinafter in greater detail during reference to FIG. 5.

In use, the graphics processor 208 operates to process an image 204 for projecting such image 204 onto a three-dimensional object 212. In the present embodiment, the image 204 may be processed as a function of various input for improving projection.

For example, the graphics processor 208 may be fed three-dimensional information 202 associated with the three-dimensional object. In various embodiments, the three-dimensional information 202 may include a three-dimensional model. Such model may, in turn, include, but is not limited to various data such as information describing a size, shape, geometry, surface, etc. of the three-dimensional object 212.

To accomplish this, three-dimensional information 202 may be received from any one of a plurality of three-dimensional information sources. For example, the three-dimensional information 202 may be generated by and received from a three-dimensional scanner, a computer aided design (CAD) program (which may even be used to generate a model which, in turn, may be used to manufacture the three-dimensional object 212), etc. A three-dimensional scanner includes a device that analyzes a real-world object or environment to collect data on shape, etc. for generating a model. Of course, the three-dimensional information 202 may even be manually entered by a user (e.g. selecting a shape from a predetermined list of pre-defined shapes, etc.).

With this three-dimensional information 202, the image 204 may be projected in a way that is tailored for the three-dimensional characteristics of the three-dimensional object 212. For example, in the case of a cylindrical three-dimensional object 212 like that shown in FIG. 2, the image 204 may be distorted to match or map to the curvature of the peripheral contour of such object 212. Of course, any aspect of the image 204 (e even color, etc.) may be altered as a function of any aspect of the three-dimensional object 212, as described by the three-dimensional information 202.

In a similar manner, environmental information 206 may be received by the graphics processor 208 so that processing of the image 204 may be tailored to suit the environment as well. For example, the processing of the graphics processor 208 may also be performed as a function of an amount of ambient light, in an environment of the three-dimensional object 212. In such example, an intensity or brightness of the image 204 may be adjusted to compensate for excessive ambient light. Of course, such ambient light may be gauged utilizing a light sensor etc.

As yet another example, the processing may be performed as a function of a respective position of the three-dimensional object 212 and the projector 210. For instance, if it is determined that the projector 210 resides in a plane below that in which the three-dimensional object 212 resides, the image 204 may be distorted in a way that prevents a vertical elongation of the image 204, thus compensating for any unwanted affects of such relative position in one embodiment, such relative position may be manually entered, identified utilizing global positioning system, and/or any other location-identifying mechanism.

To this end, the graphics processor 208 may process the image 204 in manner that is specifically tailored for not only the three-dimensional object 212, but also environmental conditions, etc. Of course, it should be noted that the foregoing examples of input or feedback are set forth for illustrative purposes only and should not be construed as limiting in any manner.

Figure 3:
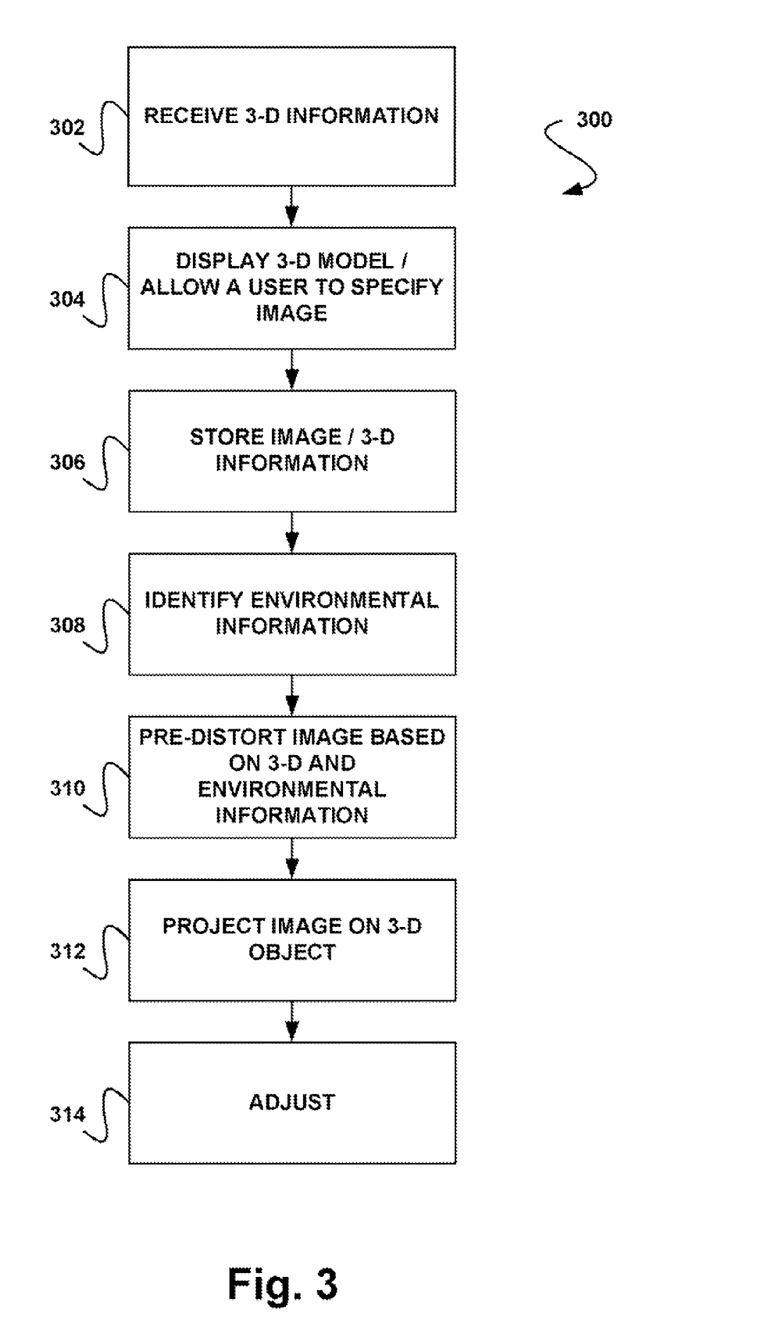
FIG. 3 shows a method for projecting an image onto a three-dimensional object, in accordance with yet another embodiment.

FIG. 3 shows a method 300 for projecting an image onto a three-dimensional object, in accordance with yet another embodiment. As an option, the present method 300 may be carried out in the context of the system 200 of FIG. 2. Of course, however, the method 300 may be used in any desired environment. Again, the above definitions may apply during the following description.

As shown, in operation 302, three-dimensional information associated with a three-dimensional object is received from an appropriate source (e.g. see, for example, item 202 of FIG. 2, etc.). Strictly as an option, such three-dimensional object may be depicted for a user utilizing a display (e.g. computer monitor, etc.), based on the three-dimensional information. Such depiction may, in one embodiment, be facilitated utilizing a graphics processor (e.g. see, for example, the graphics processor 208 of FIG. 2, etc.). See operation 304.

Thus, using the present method 300, the user may not only select, generate, specify, import, or otherwise provide for the receipt of an appropriate image to be projected onto the three-dimensional object, but may also view a two-dimensional depiction of the three-dimensional object with or without the image thereon. This may be further accomplished, prior to any actual projection. As yet another option, the user may even alter any aspect (e.g. color, shape, etc.) of the image during such operation. To this end, the desired image, three-dimensional information, and any user input, etc. may be stored prior to projection, as indicated in operation 306.

As yet another option, environmental information may be received in operation 308 from an appropriate source. To this end, the image may be pre-distorted based on three-dimensional information, environmental information, etc. See operation 310. In one embodiment, the pre-distortion may involve an inverse model of the three-dimensional object while calculating the image to be projected.

As yet another option, the user may optimally position the projector and the three-dimensional object at this point. This may be accomplished, for example, by projecting a marker (e.g. cross-hair, etc.) indicating a center of the image that will subsequently be projected. To this end, the marker may be manually aligned with a center of the three-dimensional object, by physically maneuvering the projector and/or three-dimensional object.

Next, the image may be projected onto the three-dimensional object. See operation 312. Thereafter, in operation 314, any desired adjustment may be carried out to optimize the resultant projection. Of course, such adjustment may be physical in nature (e.g. further moving the projector and/or object, etc.) and/or processing, in nature (e.g. automatically adjusting the image based on changing environmental conditions, manually adjusting the image, etc.).

Figure 4:
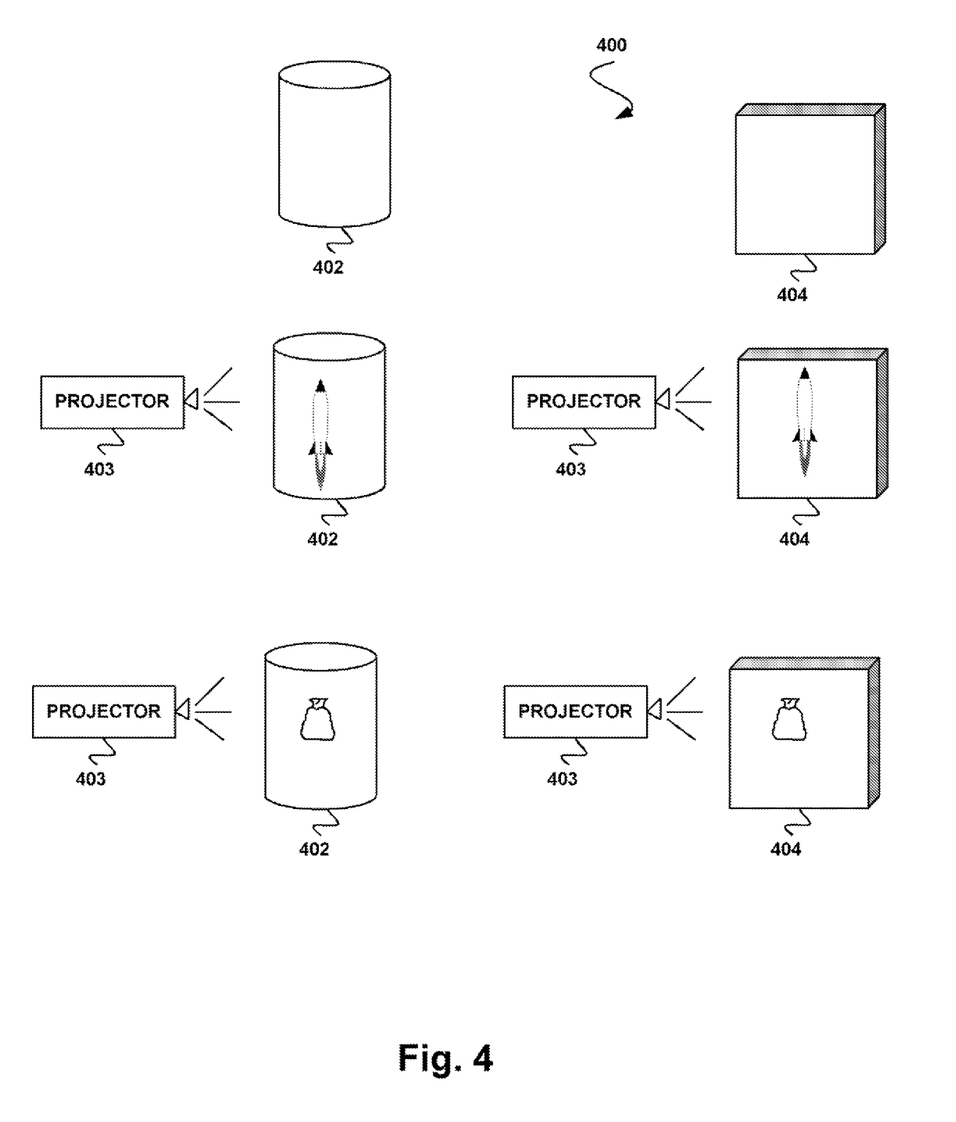
FIG. 4 shows a system for projecting an image onto a three-dimensional object in the context of various applications, in accordance with still yet another embodiment.

FIG. 4 shows a system 400 for projecting an image onto a three-dimensional object in the context of various applications, in accordance with still yet another embodiment. As shown, using a projector 403, any image may be dynamically processed for projecting the image onto any one of a plurality of different three-dimensional objects 402, 404. Specifically, the system 400 allows far the convenient projection of different images on different objects, a feature which may be suitable for a variety of applications.

For example, in the context of advertising, dynamic images may be produced on a white surface of an object with a shape of a product. Still yet, in an embodiment involving industrial design, a fabricated blank three-dimensional model of a particular industrial part may be "painted" dynamically during a design/review phase. This may save time and expense associated with preparing multiple samples with real surface treatments.

In an education-related embodiment, a white three-dimensional model of particular object may be dynamically changed to demonstrate different features or stages of development. For example, such object may represent a part of the human body and images may be projected which each show different symptoms, etc. Of course, the present technology may have applications in the entertainment industry (e.g. theme parks, etc.).

In the field of exposition and art, three-dimensional surfaces may be more attractive and expressive than traditional flat screens. For example, a cave display surrounding a viewer may be provided. Of course, the foregoing exemplary applications are set forth for illustrative purposes only and should not be construed as limiting in any manner.

To this end, a realistic three-dimensional experience may be provided without necessarily requiring three-dimensional glasses, special filters, etc. Of course, however, embodiments with such items are also contemplated.

Figure 5:
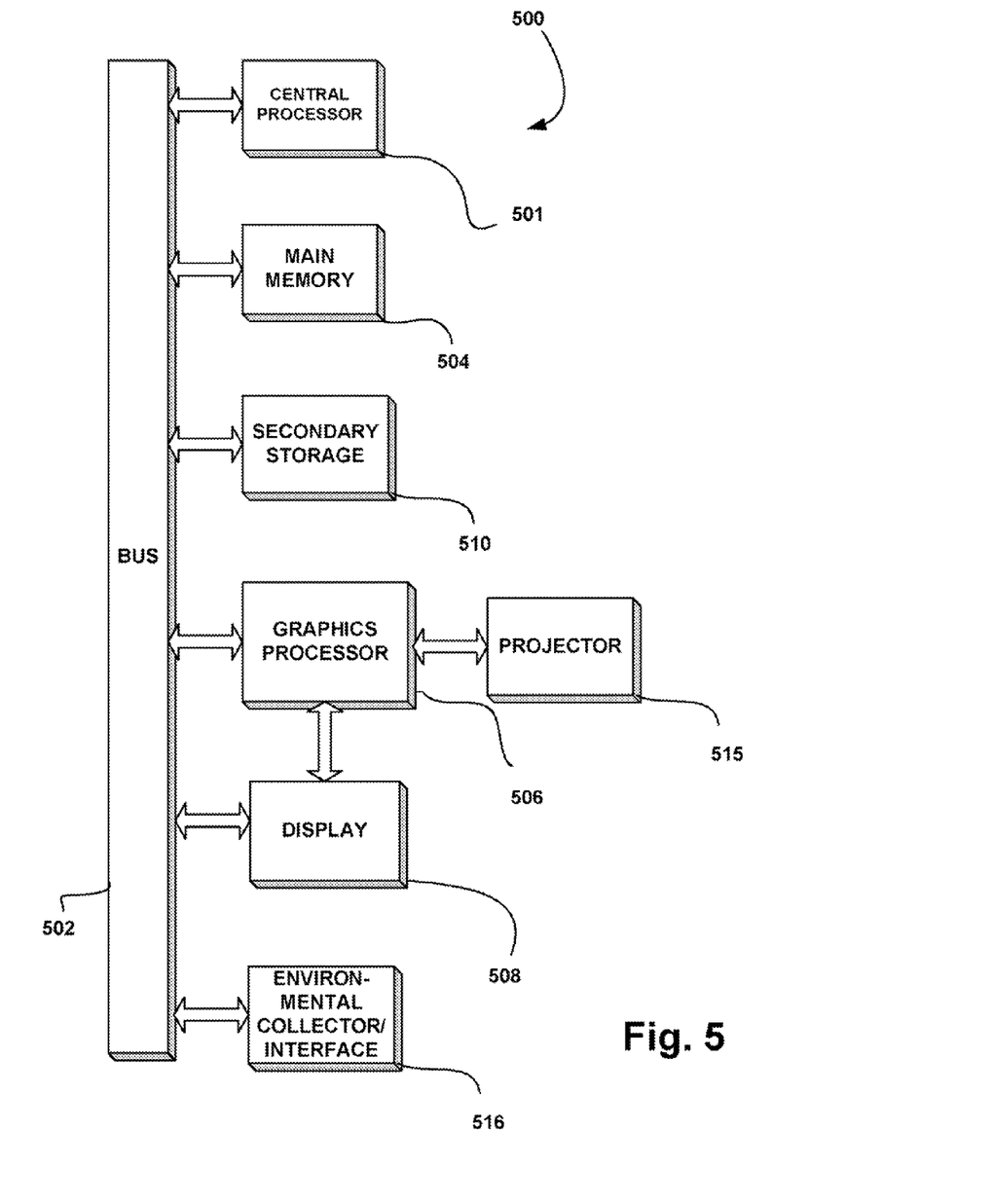
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. For example, the various systems described during the description of previous figures may optionally take the following form. It should be noted that each of the various components of the system 500 set forth below may or may not be integrated into separate and/or a single device.

As shown, a system 500 is provided including at least one host processor 501 which is connected to a communication bus 502. The system 500 also includes a main memory 504. Control logic (software) and data are stored in the main memory 504 which may take the form of random access memory (RAM).

The system 500 also includes a graphics processor 506 and a display 508, i.e. a computer monitor. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

Further included is a projector 515 that remains in communication with the graphics processor 506 (or possibly another unillustrated graphics processor, etc.) for projecting images (and even video) onto a three-dimensional object, in the manner set forth hereinabove. Such projector 515 may include a digital light processing, a liquid crystal display projector, and/or any other desired type of projector.

As an option, an environmental collector/interface 516 (e.g. see block 206 of FIG. 2, etc.) may be included for collecting environmental information, and presenting it to the system 500 via bus 502, for the reasons discussed hereinabove. In various embodiments, the environmental collector/interface 516 may include one or more sensors which may provide information about a location, angle, speed, etc. of a 3D object, as well as other information (e.g. parameters like ambient lighting, etc.).

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions. Memory 504, storage 510 and/or any other storage are possible examples of computer-readable media.

In one embodiment, the architecture and/or functionality of the various previous figures may be implemented in the context of the host processor 501, graphics processor 506, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving an image; and
   processing the image utilizing a graphics processor for projecting the image onto a three-dimensional object, the graphics processor including a shader module and a rasterization module each situated on a single semiconductor platform to form a graphics processing unit (GPU);
   wherein the three-dimensional object includes a physical object with a three-dimensional surface onto which the image is projected;
   wherein the processing of the image includes distorting the image utilizing an inverse model of the three-dimensional object prior to projecting the image onto the physical object.

2. The method as recited in claim 1, wherein the image is dynamically processed for projecting the image onto any one of a plurality of different three-dimensional objects.

3. The method as recited in claim 1, wherein the projecting is performed by a projector in communication with the graphics processor.

4. The method as recited in claim 3, wherein the projector includes a digital light processing projector.

5. The method as recited in claim 3, wherein the projector includes a liquid crystal display projector.

6. The method as recited in claim 3, wherein the processing is performed as a function of a respective position of the three-dimensional object and the projector.

7. The method as recited in claim 6, wherein the position is tuned by projecting a marker onto the three-dimensional object.

8. The method as recited in claim 1, wherein the processing is performed as a function of at least one environmental condition.

9. The method as recited in claim 8, wherein the at least one environmental condition includes ambient light.

10. The method as recited in claim 1, wherein the processing is performed as a function of three-dimensional information associated with the three-dimensional object.

11. The method as recited in claim 10, wherein the three-dimensional information includes a three-dimensional model.

12. The method as recited in claim 10, wherein the three-dimensional information is generated by a computer aided design program.

13. The method as recited in claim 12, wherein the three-dimensional object is manufactured utilizing the computer aided design program.

14. The method as recited in claim 1, wherein the image is user-generated.

15. The method as recited in claim 1, wherein a plurality of images is projected onto the three-dimensional object in the form of video.

16. A method, comprising:
receiving an image and three-dimensional information associated with a three-dimensional object; and
processing the image as a function of the three-dimensional information utilizing a graphics processor, for projecting the image onto the three-dimensional object, the graphics processor including a shader module and a rasterization module each situated on a single semiconductor platform to form a graphics processing unit (GPU);
wherein the three-dimensional object includes a physical object with a three-dimensional surface onto which the image is projected;
wherein the processing of the image includes distorting the image utilizing an inverse model of the three-dimensional object prior to projecting the image onto the physical object.

17. The method as recited in claim 6, wherein the respective position is identified utilizing a global positioning system.

18. The method as recited in claim 1, wherein the processing is performed as a function of three-dimensional information associated with the three-dimensional surface onto which the image is projected.

19. The method as recited in claim 11, wherein the three-dimensional model includes information describing the three-dimensional surface onto which the image is projected.

20. The method as recited in claim 1, wherein the three-dimensional object is a cylindrical three-dimensional object.

21. The method as recited in claim 1, wherein the processing is performed as a function of at least one environmental condition that includes at least one of a location of the physical object, an angle of the physical object, or a speed of the physical object.

22. The method as recited in claim 10, wherein the processing includes altering a color of the image as a function of the three-dimensional information.

23. The method as recited in claim 1, wherein the image is automatically adjusted based on at least one changing environmental condition.

* * * * *

UNITED STATES PATENT AND TRADEMARK OFFICE
CERTIFICATE OF CORRECTION

| | | |
|---|---|---|
| PATENT NO. | : 7,905,610 B1 | Page 1 of 1 |
| APPLICATION NO. | : 11/468236 | |
| DATED | : March 15, 2011 | |
| INVENTOR(S) | : Shapiro | |

It is certified that error appears in the above-identified patent and that said Letters Patent is hereby corrected as shown below:

On the title page:
        Abstract (57), lines 4-5, please replace "object in" with --object. In--.

Signed and Sealed this

Thirteenth Day of September, 2011

David J. Kappos
*Director of the United States Patent and Trademark Office*